United States Patent [19]

Beerens

[11] Patent Number: 5,636,935
[45] Date of Patent: Jun. 10, 1997

[54] SAW CHAIN DRIVE DEVICE AND METHOD OF MANUFACTURING SAW CHAIN DRIVE DEVICE

[75] Inventor: Cornelis J. M. Beerens, Sunshine, Australia

[73] Assignee: Griffiths & Beerens Pty. Ltd., Australia

[21] Appl. No.: 260,610

[22] Filed: Jun. 15, 1994

Related U.S. Application Data

[63] Continuation of Ser. No. 982,475, Nov. 27, 1992, abandoned.

[51] Int. Cl.⁶ ........................................ B25G 3/00
[52] U.S. Cl. ........................ 403/241; 403/263; 74/112
[58] Field of Search .................. 403/240, 241, 403/251, 263; 74/112

[56] References Cited

U.S. PATENT DOCUMENTS

| | | | |
|---|---|---|---|
| 3,339,596 | 9/1967 | Deelman | 464/71 |
| 3,492,769 | 2/1970 | Olson | 403/240 |
| 3,519,037 | 7/1970 | Linkfield | 474/158 |
| 3,581,853 | 6/1971 | Hoff | 192/12 BA |
| 3,849,884 | 11/1974 | Arff | 192/48.3 |
| 3,991,864 | 11/1976 | Müller | 192/67 R |

FOREIGN PATENT DOCUMENTS

90/00320 2/1991 WIPO .

*Primary Examiner*—Joseph J. Hail, III
*Assistant Examiner*—James Miner
*Attorney, Agent, or Firm*—Scully, Scott, Murphy & Presser

[57] ABSTRACT

A saw chain drive device comprising a clutch drum and a drive member. The clutch drum has an axis of rotation and includes an end wall forming at least two apertures, and at least one of the apertures is radially spaced from the axis of rotation. The drive member includes at least two axially extending projections adapted to be received in the apertures of the end wall. At least one of these projections forms a circumferentially extending groove positioned to be aligned with the end wall of the clutch drum when the projections of the drive member are received in the apertures of the end wall.

8 Claims, 6 Drawing Sheets

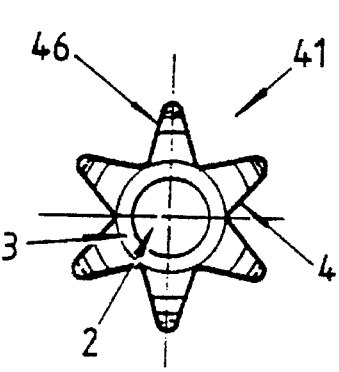
Fig. 5.
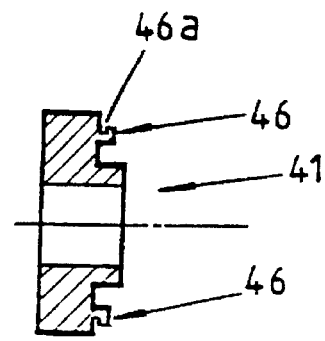
Fig. 5a.
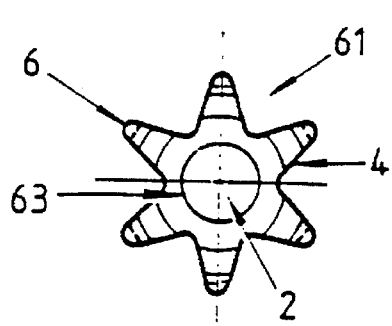
Fig. 6.
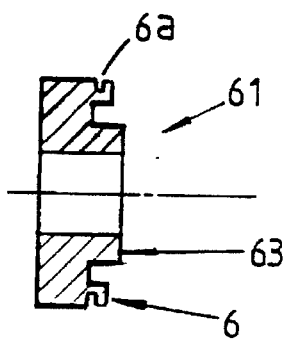
Fig. 6a.
Fig. 8a. Fig. 8.
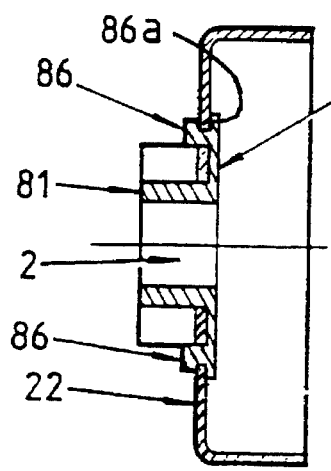
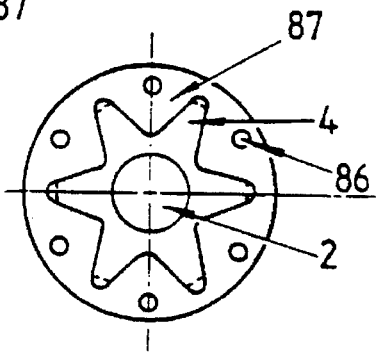

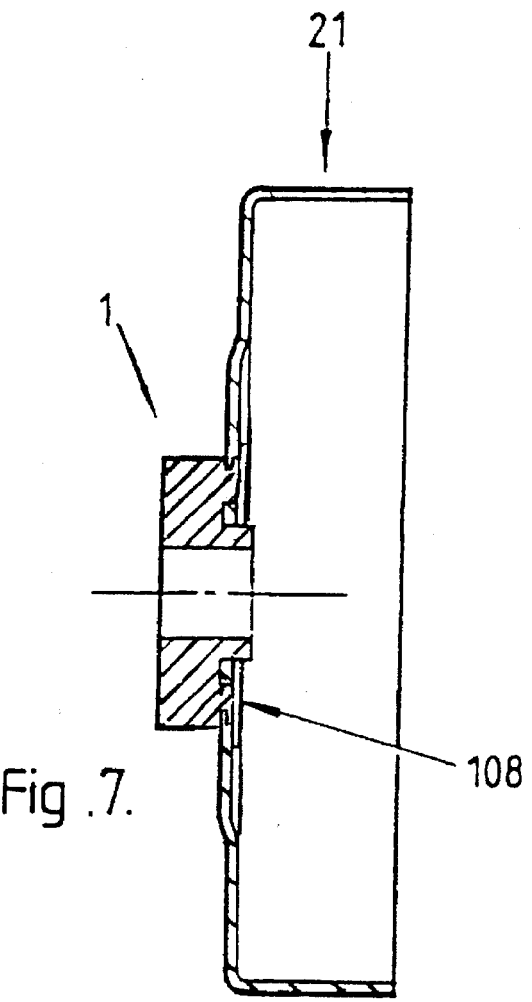
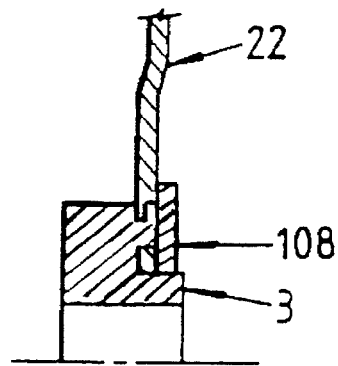
Fig. 7.  Fig. 7a.
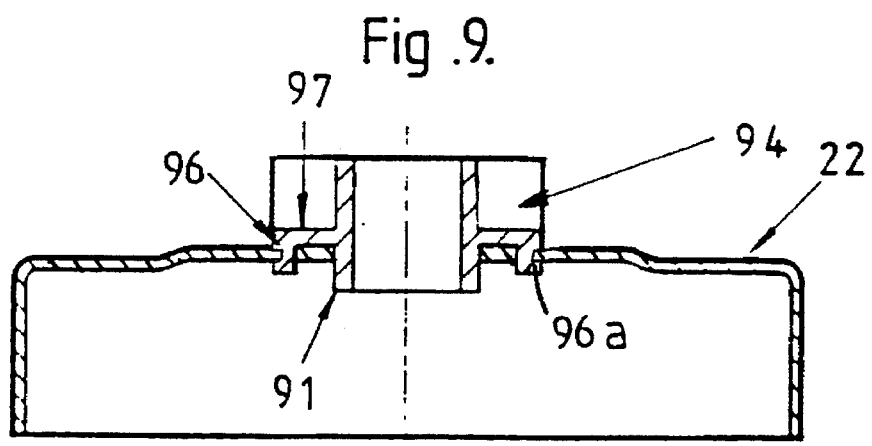
Fig. 9.

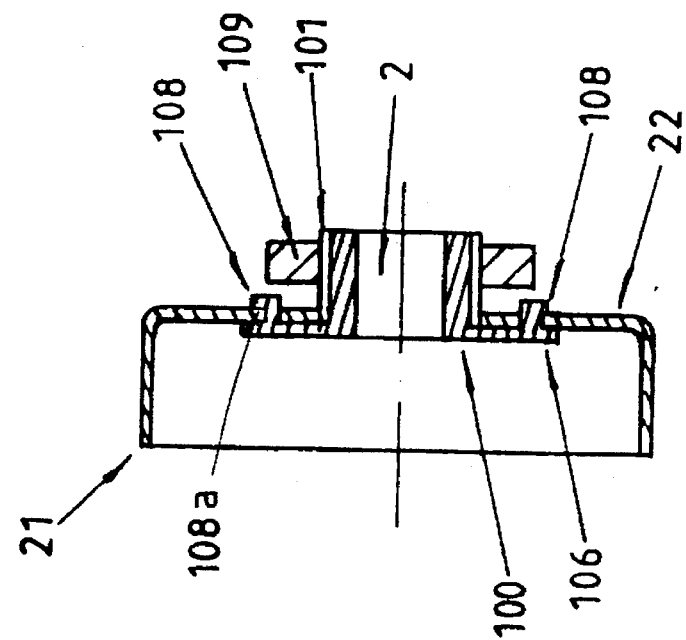
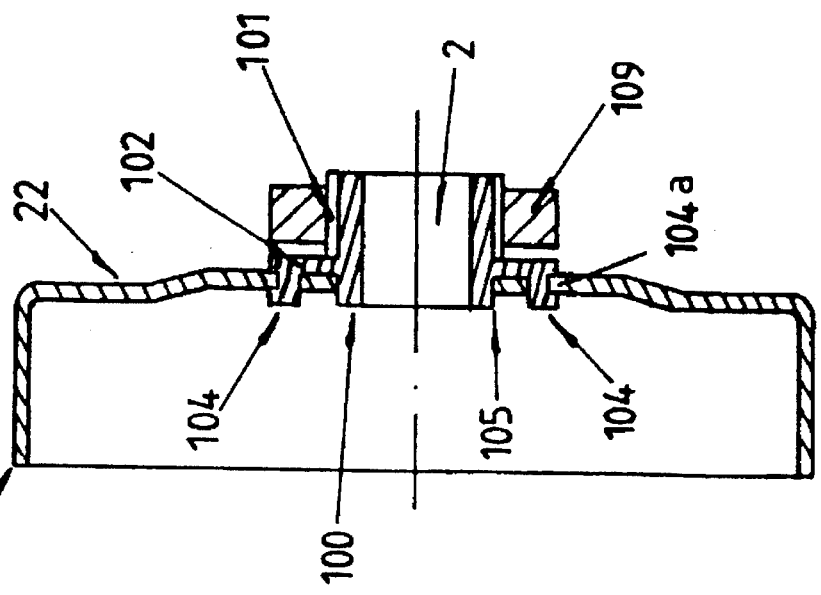

SAW CHAIN DRIVE DEVICE AND METHOD OF MANUFACTURING SAW CHAIN DRIVE DEVICE

This is a continuation of application Ser. No. 982,475 filed on Nov. 27, 1992 now abandoned.

BACKGROUND OF THE INVENTION

This invention generally relates to saw chain drive devices, and more specifically, to devices of this type comprising a clutch drum and a drive means permanently fixed on the clutch drum.

The invention relates to two forms of drive means, a fixed drive sprocket which directly drives the saw chain, and a fixed drive spline which drives the saw chain indirectly with the addition of a replaceable drive sprocket. In the first instance the drive sprocket is permanently fixed to the clutch drum and in the second instance the drive spline is permanently fixed to the clutch drum.

It is conventional in the manufacture of saw chain drive devices to fix the drive means to the clutch drum by brazing. The weakness of this construction is that the torque transferred from the clutch drum to the drive means is limited by the strength and the quality of the brazed joint and the brazing material.

A basic improvement on this conventional manufacturing process is disclosed in Australian Patent Application No. 895,636 and PCT Patent Application No. PCT/Au90/00320. In accordance with this improvement, there is provided a saw chain drive device comprising a clutch drum and drive means, said clutch drum comprising an end wall provided with at least two apertures, with at least one of said apertures being radially spaced from the axis of rotation of said saw chain drive device, said drive means being provided with at least two projections located so as to be received in said apertures of said end wall such that said drive means is rotationally immovable relative to said clutch drum.

The above-identified Australian and PCT patent applications also disclose a method of forming a saw chain drive device comprising a clutch drum and drive means, said drive means being provided with at least two projections, said projections being used as a punch tool to form at least one aperture radially spaced from the axis of rotation within the end wall of the said clutch drum.

This improved saw chain drive device relies on a mechanical connection between the drive means and the clutch drum, and can be used as a substitute or in addition to conventional brazing techniques to give added strength to the final product.

This improved product has very high torsional strength; however, the above-mentioned mechanical connection between the drive means and the clutch drum does not provide for any lateral fixing of the drive means to the clutch drum—that is, along the axis of the chain drive device. As a result of this, the drive means has a tendency to work itself loose from the clutch drum.

SUMMARY OF THE INVENTION

Accordingly, it is an object of this invention to provide a saw chain drive device comprising a clutch drum and drive means, wherein these two parts are connected together, first, for unitary rotary movement, and second, to hold the drive means on the clutch drum against axial movement relative thereto.

It is a further object of the invention to provide a method of forming a saw chain drive device comprising a clutch drum and drive means, whereby these two parts are connected together both for unitary rotary movement and against relative axial movement.

These and other objectives are attained with a saw chain drive device comprising a clutch drum and a drive means mounted thereon. The clutch drum defines an axis of rotation and includes an end wall forming at least two apertures, at least one of which is radially spaced from that axis of rotation. The drive means includes at least two axially extending projections that are received in the apertures of the end wall of the clutch drum, connecting the drive means to the clutch drum for unitary rotary movement therewith. In addition, at least one of the projections of the drive means forms a circumferentially extending groove, and the clutch drum further includes a radial flange extending into that circumferential groove to hold the drive means on the clutch drum against axial movement relative thereto.

Preferably, the saw chain drive device is assembled by inserting each of the projections of the drive means into a respective one of the apertures in the clutch drum, and then the end wall of the clutch drum is forged to form the above-mentioned flange extending into the circumferential groove on the projection of the drive means.

To aid securement of the drive means to the clutch drum the said projections may in part be deformed after insertion in the apertures of the end wall. Such deformation may be carried out with or without the assistance of heat application. As an alternative thereto, a body such as a washer, may be welded to the projections once inserted through the apertures of the end wall or welded to both the projections and the end wall of the clutch drum.

In the preferred embodiment, said drive means comprises a drive sprocket with one said radially spaced projections projecting axially from each tooth of the fixed drive sprocket. In an alternative preferred embodiment, the drive means may include a flange, and the projections are extended from the flange. Such a drive means may be inserted from outside or within the clutch drum.

In a preferred method of forming the saw chain drive device, the drive means and clutch drum are pressed together, the projections of the drive means being used as a punch tool to create the apertures in the end wall of the clutch drum during assembly. If desired, the drive means and the clutch drum may additionally be brazed together to give added strength to the product. While brazing might be employed as desired, it should not be regarded as being essential to the present invention.

Further benefits and advantages of the invention will become apparent from a consideration of the following detailed description given with reference to the accompanying drawings, which specify and show preferred embodiments of the invention.

3

Figure 1:
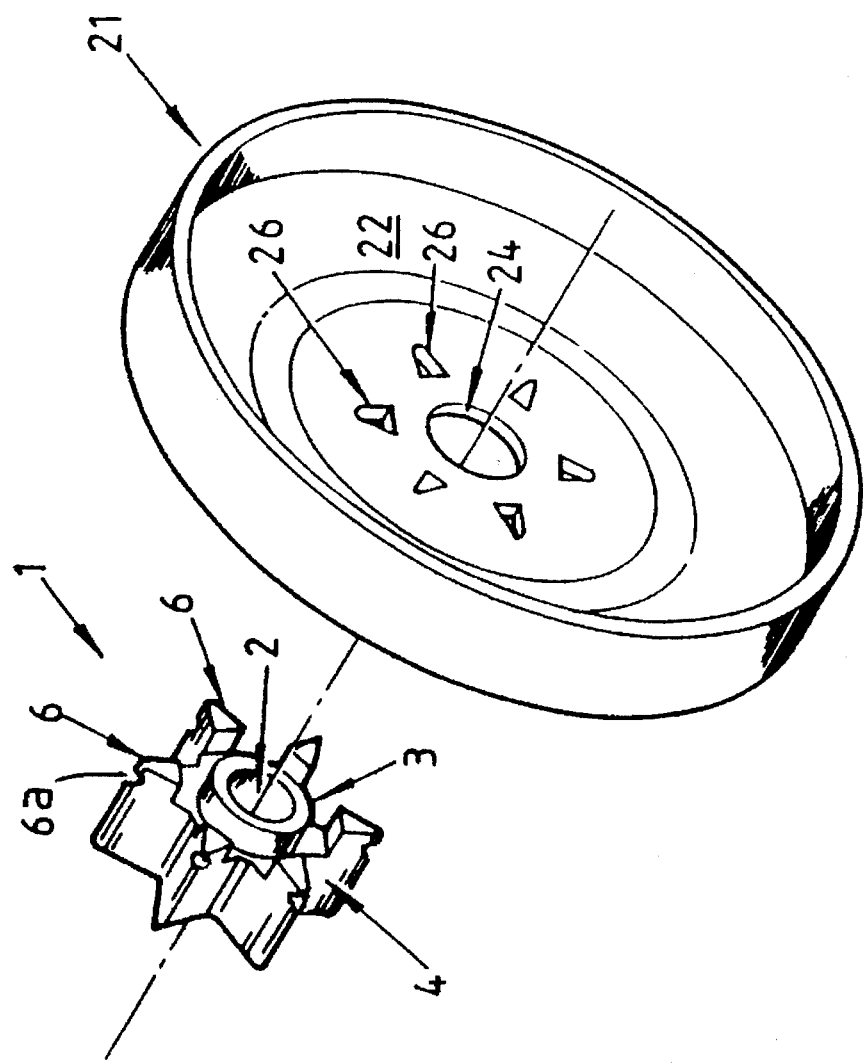
FIG. 1 is a perspective view showing the drive means and the clutch drum of the saw chain drive device of this invention, in a disassembled condition.
Figure 3:
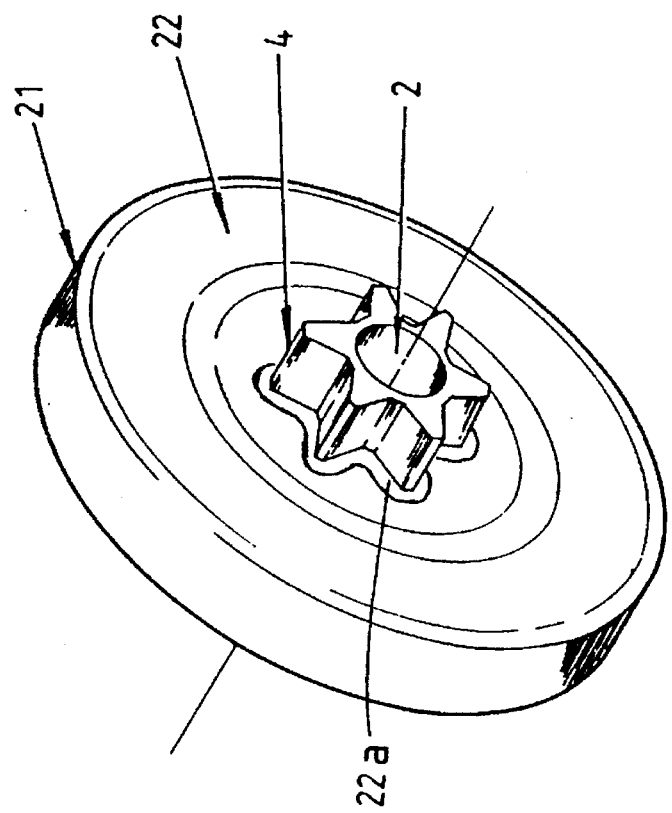
FIG. 3 is a perspective view of the saw chain drive device in a final assembled condition.

FIG. 5 is a plan view of an alternative fixed drive sprocket that may also be employed in this invention.

FIG. 5a is a sectional view of the fixed drive sprocket of FIG. 5.

FIG. 6 is a plan view of a further alternative fixed drive sprocket that may also be employed in this invention.

FIG. 6a is a sectional view of the fixed drive sprocket of FIG. 6.

FIG. 7 is a sectional view of a further embodiment of a clutch drum and a fixed drive sprocket in accordance with this invention.

FIG. 7a is a partial enlarged sectional view of the circled portion of FIG. 7.

FIG. 8 is a plan view of an alternative fixed drive sprocket in accordance with this invention wherein the projections are formed upon a flange extending from the sprocket, and the sprocket is inserted from within the clutch drum.

FIG. 8a is a sectional view of the sprocket of FIG. 8 in combination with a clutch drum.

FIG. 9 is a sectional view of a somewhat similar fixed drive sprocket and clutch drum of FIG. 8a wherein the sprocket is inserted from outside the clutch drum.

FIGS. 10 and 11 are sectional views similar to FIGS. 8a and 9 showing an alternative embodiment employing a fixed drive spline as a drive means. These Figures also show the placement of a removable drive sprocket placed on the spline section of the fixed drive spline.

DETAILED DESCRIPTION OF THE PREFERRED EMBODIMENT

A particularly preferred embodiment of the invention will now be discussed with reference for FIGS. 1 to 4b.

A fixed drive sprocket 1 is provided with a through bore 2, a spigot 3 and teeth 4. Said teeth 4 are provided with projections 6 which are located around the perimeter of the fixed drive sprocket 1, and each projection 6 is provided with a circumferentially extending groove 6a. A clutch drum 21 has an end wall 22 and apertures 26 located radially with respect to the axis of rotation of the clutch drum and a centrally located aperture 24. When formed (FIGS. 3, 4, and 4b), the projections 6 of the fixed drive sprocket 1 is received in the central aperture 24 of the end wall 22 of the clutch drum 21.

In a particularly preferred method of formation of saw chain drive devices of the invention, the fixed drive sprocket 2 is used as a punch tool, the projections 6 forming the apertures 26 and the central aperture 24 acting as a guide by receiving spigot 3 of the fixed drive sprocket.

In an alternative method, the central aperture 24 is also formed by using the fixed drive sprocket 1 as a punch tool. In this case both the spigot 3 and the projections 6 of the fixed drive sprocket 1 form the apertures 24 and 26 in the end wall of the clutch drum 21.

In a further, but less preferred method formation of the saw chain drive device of this invention, radially located apertures 26 and the central aperture 24 in the end wall 22 of the clutch drum 21 are preformed. The projections 6 and the spigot 3 of the fixed drive sprocket 1 are then pushed into the apertures 24 and 26.

Figure 2:
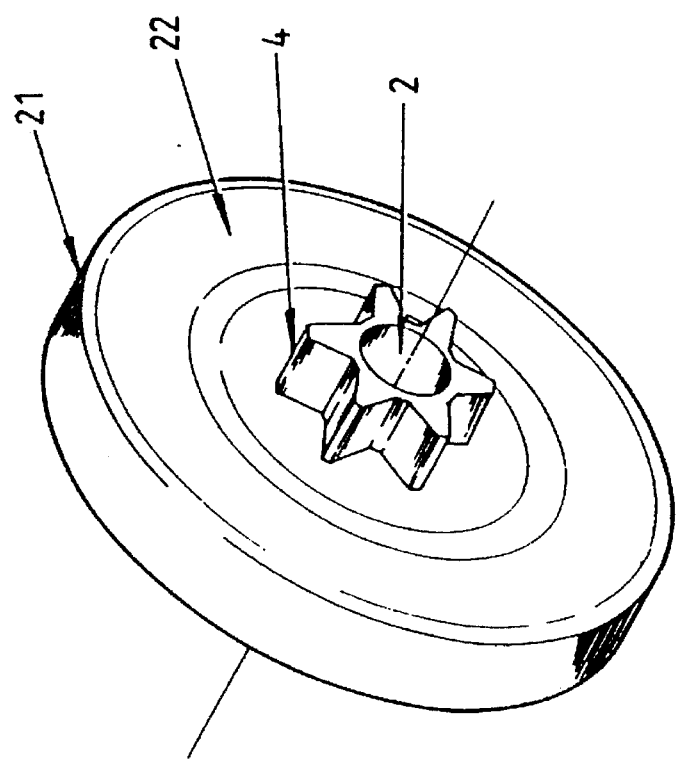
FIG. 2 is a perspective view of the saw chain drive device of the present invention in a partially assembled condition.
Figure 4B:
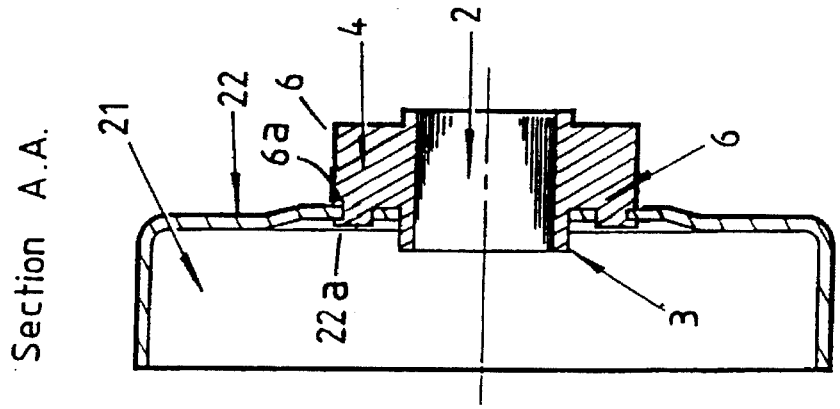
FIG. 4b is a sectional view taken along line aa of FIG. 4.
Figure 4:
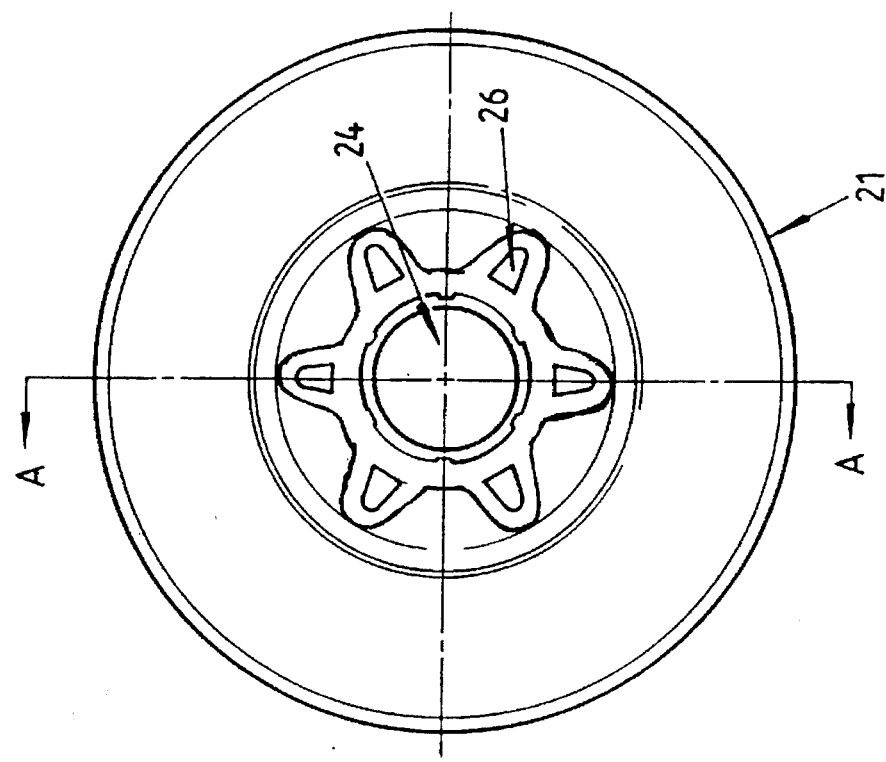
FIG. 4 is an elevation view showing the inside of a clutch drum in accordance with this invention.
Figure 4A:
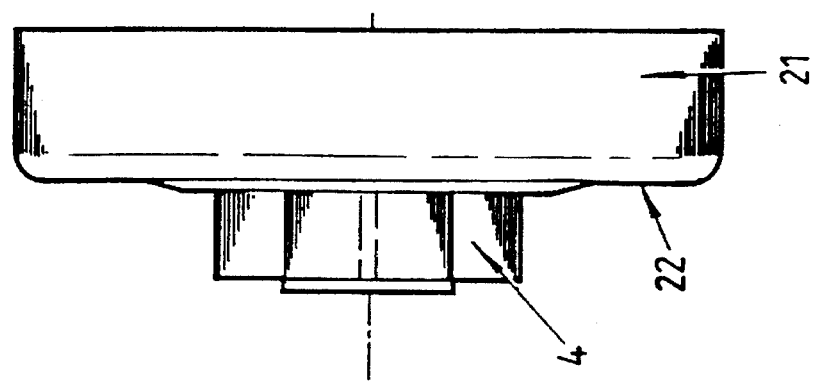
FIG. 4a is a side view of a clutch drum of FIG. 4.

In all three of the above methods of formation, the drive sprocket is mounted on the clutch drum, as shown in FIG. 2, and then the portion of the end plate 22 immediately outside the drive sprocket is forged to press that end plate into grooves 6a and to form flange 22a on the end plate. Any suitable procedure may be used to press end plate 22 into grooves 6a; and, for instance, the end plate may be compressed or stamped between opposing die members.

With the arrangement of the present invention, projections 6 connect the drive sprocket to the clutch drum for unitary rotation therewith, and flange 22a holds the drive sprocket on the clutch drum against axial movement relative thereto. Preferably flange 22a holds the drive sprocket tightly on the clutch drum and substantially prevents any axial movement of the drive sprocket relative to the clutch drum.

In addition, all three of the above methods of formation it is possible to additionally fix the fixed drive sprocket 1 to the clutch drum 21 by additional means.

An alternative sprocket in accordance with this invention is illustrated in FIGS. 5 and 5a. The fixed drive sprocket 41 has a central through bore 2, a spigot 3, projections 46 and circumferential grooves 46a. The projections 46 are, however, spaced inward from the circumferential ends of the teeth 4. In this embodiment of the invention, the location of the radially located apertures 26 in the end wall 22 of the clutch drum 21 must be also suitably relocated so as to receive projections 46 of the fixed drive sprocket 41.

In a further embodiment of the invention (FIG. 6 and 6a), a fixed drive sprocket 61 is provided with teeth 4, a central through bore 2, projections 6 and circumferentially extending grooves 6a. However, in this case the spigot 63 is not round, being of large enough diameter so as to be reshaped while forming the teeth 4. The projections 6 may or may not be spaced inwardly from the radial ends of the teeth 4.

As an addition to the simple mechanical connection between the fixed drive sprocket 1 and the clutch drum 21, it is possible to fix the drive sprocket 1 to the clutch drum 21 by additional means. This is illustrated in FIGS. 7 and 7a which show a fixed drive sprocket 1 with projections 6 received in apertures (not shown) of the clutch drum 21. The fixed drive sprocket 1 is permanently fixed to the clutch drum 21 by the permanent connection of a washer 108 to the projections 6.

In another form of the invention shown in FIGS. 8 and 8a, the fixed drive sprocket 81 is formed with a flange 87, and a number of axially extending projections 86 extend from the flange 87 in the same direction as teeth 4 and generally between the teeth 4. Circumferential grooves 86a are formed in the projections 86. In this embodiment, the flange 87 engages against the inner surface of the end wall 22 of the clutch drum 21 when assembled. The projections 86 engage in appropriate apertures in the end wall 22 of the clutch drum 21 when assembled as shown in FIG. 8a, and that end wall extends into grooves 86a to hold the drive sprocket 81 on the clutch drum against axial movement.

FIG. 9 shows a further embodiment somewhat similar to FIGS. 8 and 8a except that in this embodiment the flange 97 engages an outer surface of the end wall 22 of the clutch drum 21. In this arrangement, a number of radially spaced projections 96 extend from the flange in the opposite direction as the teeth 4 and when assembled with the drum, engage in appropriately located apertures located in the end wall 22. Also, grooves 96a are formed in projections 96, and when the drive sprocket is mounted on the clutch drum, end wall 22 extends into groove 96a to hold the drive sprocket on the clutch drum against axial movement. In this embodiment, a central spigot 91 is located within a central aperture centered on the axis of rotation of the saw chain drive device.

FIGS. 10 and 11 illustrate further alternative embodiments somewhat similar to FIGS. 8a and 9 except that in this case the drive means is a fixed drive spline 100. A removable drive sprocket 109 is shown placed on the spline connection 101.

In FIG. 10, the fixed drive spline 100 has flange 102 on which the spline connection 101 is formed. The flange 102 engages with an outer surface of the end wall 22 of the clutch drum 21. The flange 102 has one or more and preferably a number of projections 104 extending axially into the clutch drum 21 to engage in appropriate apertures in the end wall 22. Circumferentially extending grooves 104a are formed on projections 104; and, in the assembled condition, end plate 22 extends into those grooves to hold the drive spline against axial movement relative to the clutch drum. A central spigot 105 engages in a central aperture of the end wall 22 and the removable drive sprocket 109 may be slid on or off the spline connection 101 as desired.

FIG. 11 illustrates a similar arrangement to FIG. 10, except that the flange 106 on which spline connection 101 is formed, engaged an inner surface on the end wall 22 of the clutch drum 21. In this arrangement, the spline connection 101 is pushed through a central aperture in the end wall 22 while projections 108 are engaged in appropriate apertures in the end wall 22. Circumferentially extending grooves 108a are formed in projections 108, and in the assembled condition shown in FIG. 11, end wall 22 is pressed into those grooves 108a to hold the drive spline on the clutch drum against axial movement.

It will of course be appreciated that modifications of the present invention within the scope of the accompanying claims are envisaged. For example, it is not essential that the fixed drive sprocket 1 or the fixed drive spline 100 should have a central spigot that is engaged within a central aperture of the end wall 22 of the clutch drum 21.

It can be seen that the saw chain drive device according to the invention is formed without requiring that the drive means be fixed to the clutch drum by brazing. The number of apertures through which the drive means projections are received give to the saw chain drive device added strength. Substitution of the need to braze the two pieces together allows many variations on the methods of manufacturing a saw chain drive device. The device and the method of the present invention provide significant advantages over saw chain drive device and methods of manufacture.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the preset invention.

What is claimed is:

1. A saw chain drive device comprising:

a clutch drum having an axis of rotation, and including an end wall forming at least two apertures, with at least one of said apertures being radially spaced from said axis of rotation; and a drive means having an axis defining an axial direction, and including i) a central body, and ii) at least two axially extending projections integrally formed with the central body and adapted to be received in the apertures of said end wall;

at least one of said projections being radially spaced from the axis of the drive means and including a U-shaped surface forming a circumferentially extending groove, said groove opening radially outwardly and positioned to be aligned with the end wall of the clutch drum when the projections of the drive means are received in the apertures of the end wall.

2. A saw chain drive device according to claim 1, wherein one of said projections comprises a centrally located spigot; and one of said apertures includes a centrally located aperture sized to receive said spigot.

3. A saw chain drive device according to claim 2, wherein the other of said projections forms the circumferentially extending groove.

4. A saw chain drive device comprising:

a clutch drum having an axis of rotation, and including an end wall forming at least two apertures, with at least one of said apertures being radially spaced from said axis of rotation; and a fixed drive sprocket having an axis defining an axial direction, and including i) a central body including a plurality of radially extending teeth, and ii) a plurality of axially extending projections integrally formed with the central body and adapted to be received in the apertures of said end wall;

wherein each of the projections axially extends from a respective one of the teeth,.and at least one of the projections is radially spaced from the axis of the drive sprocket; and further wherein each of the projections includes a U-shaped surface forming a circumferentially extending groove; said groove circumferentially extending along said each projection, opening radially outwardly, and positioned to be aligned with the end wall of the clutch drum when the projections of the drive sprocket are received in the apertures of the end wall.

5. A saw chain drive device, comprising:

a clutch drum having an axis of rotation defining an axial direction, and including an end wall forming at least two apertures, with at least one of said apertures being radially spaced from said axis of rotation;

a drive means including i) a central body defining an axis of the drive means, and ii) at least two axially extending projections integrally formed with the central body and received in the apertures of said end wall and connecting the drive means to the clutch drum for unitary rotary movement therewith;

at least one of said projections being radially spaced from the axis of the drive means and including a U-shaped surface forming a circumferentially extending groove, said groove opening radially outwardly; and the clutch drum further including a radial flange extending into said circumferential groove to hold the drive means on the clutch drum against axial movement relative thereto.

6. A saw chain drive device according to claim 5, wherein:

the radial flange is pressed into said circumferential groove after the drive means is mounted on the clutch drum.

7. A saw chain drive device according to claim 6, wherein said radial flange is tightly pressed into said circumferential groove and substantially prevents axial movement of the drive means relative to the clutch drum.

8. A saw chain drive device comprising:

a clutch drum having an axis of rotation defining an axial direction, and including an end wall forming a plurality of apertures, with at least one of said apertures being radially spaced from said axis of rotation;

a fixed drive sprocket including i) a central body defining an axis of the drive means and including a multitude of radially extending teeth, and ii) a plurality of axially extending projections integrally formed with the central body, received in the apertures of said end wall and connecting the drive sprocket to the clutch drum for unitary rotary movement therewith;

wherein each of the projections axially extends from a respective one of the teeth, and at least one of the projections is radially spaced from the axis of the drive sprocket; and further wherein each of the projections includes a U-shaped surface forming a circumferentially extending groove; said groove circumferentially extending along said each projection, opening radially outwardly, and positioned to be aligned with the end wall of the clutch drum when the projections of the drive sprocket are received in the apertures of the end wall;

the clutch drum further including a radial flange tightly pressed into the grooves, after the drive sprocket is mounted on the clutch drum, to hold the drive sprocket on the clutch drum and substantially prevent axial movement of the drive sprocket relative to the clutch drum.

* * * * *